(12) United States Patent
Matama

(10) Patent No.: US 7,843,602 B2
(45) Date of Patent: Nov. 30, 2010

(54) IMAGE INSPECTION APPARATUS, IMAGE INSPECTING METHOD, AND PROGRAM THEREFOR

(75) Inventor: Toru Matama, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 1563 days.

(21) Appl. No.: 11/087,566

(22) Filed: Mar. 24, 2005

(65) Prior Publication Data

US 2005/0213129 A1   Sep. 29, 2005

(30) Foreign Application Priority Data

Mar. 24, 2004   (JP)   ............................... 2004-87828

(51) Int. Cl.
*G06K 15/00*   (2006.01)
(52) U.S. Cl. .................... 358/1.9; 358/1.1; 358/1.15; 358/1.16; 358/1.18; 358/504; 358/527; 345/589
(58) Field of Classification Search .................. 358/1.6, 358/1.15, 1.16, 1.9, 1.18, 504, 406; 345/589
See application file for complete search history.

(56) References Cited

U.S. PATENT DOCUMENTS

| 5,057,913 | A  | * | 10/1991 | Nagata et al. ............... 358/302 |
| 5,982,988 | A  | * | 11/1999 | Suzuki ........................ 358/1.9 |
| 5,987,220 | A  | * | 11/1999 | Terajima et al. ............. 358/1.9 |
| 6,313,923 | B1 | * | 11/2001 | Takanashi et al. .......... 358/1.18 |
| 6,954,284 | B2 | * | 10/2005 | Enomoto .................... 358/1.18 |
| 2002/0030831 | A1 | * | 3/2002 | Kinjo .......................... 358/1.9 |
| 2002/0141769 | A1 | * | 10/2002 | Phillips ....................... 399/38 |
| 2003/0133138 | A1 | * | 7/2003 | Namikata .................... 358/1.9 |
| 2003/0202010 | A1 | * | 10/2003 | Kerby et al. ................ 345/744 |
| 2003/0202715 | A1 | * | 10/2003 | Kinjo .......................... 382/282 |
| 2006/0002583 | A1 | * | 1/2006 | Reed et al. .................. 382/100 |

FOREIGN PATENT DOCUMENTS

| JP | 09-270926 |   | 10/1997 |
| JP | 10-093831 |   | 4/1998 |
| JP | 10-171042 | A | 6/1998 |
| JP | 2001-157070 | A | 6/2001 |

* cited by examiner

*Primary Examiner*—Twyler L Haskins
*Assistant Examiner*—Kent Yip
(74) *Attorney, Agent, or Firm*—Sughrue Mion, PLLC

(57) ABSTRACT

An image inspection apparatus used when an externally input image is processed and converted to printing data, and the printing data is output to a predetermined printer to allow the printer to generate a photographic print, comprising: a first storage device which associates setup information about at least a color and density of the process with each image and stores the information each time the printer is allowed to generate a photographic print; a first print simulation image generation device which generates a first print simulation image including no change in the printer based on an image to be remade and the setup information stored in the first storage device as associated with the image to be remade before the printer remakes the photographic print; and a display device which displays the first print simulation image.

10 Claims, 4 Drawing Sheets

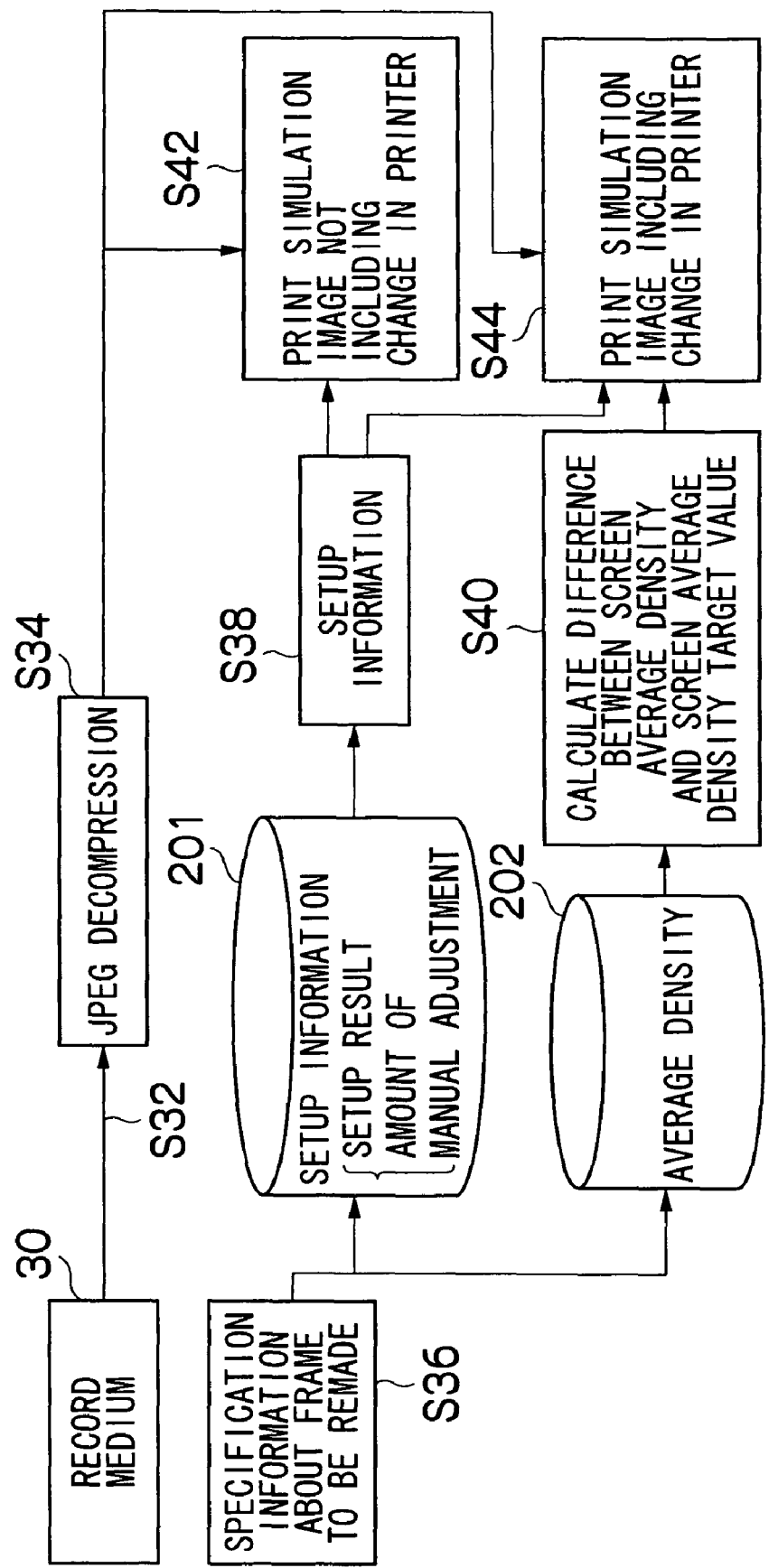

IMAGE INSPECTION APPARATUS, IMAGE INSPECTING METHOD, AND PROGRAM THEREFOR

BACKGROUND OF THE INVENTION

1. Field of the Invention

The present invention relates to an image inspection apparatus, an image inspecting method, and a program for use with the apparatus and the method, and more specifically to an image inspection apparatus and an image inspecting method capable of easily detecting the factor of a defective photographic print, and a program for use with the apparatus and the method.

2. Related Art

An image stored in a record medium such as a memory card, a film, etc. is normally read from the record medium, treated in an adjusting process relating to color density, converted to printing data, and output to the printer. When defective color density is detected in a photographic print generated by a printer, it is necessary to remake the photographic print.

Conventionally, a photographic print has been remade based on that the change with time of a printer is sufficiently adjusted.

What is described in Japanese Patent Application Laid Open No. 10-171042 can be treated by an operator in an amending operation for color density using a keyboard while observing an image displayed on a monitor. For example, the amending operation is performed for each of density (D), cyan (C), magenta (M), and yellow (Y).

SUMMARY OF THE INVENTION

The factor of defective color density of the photographic print can be the following (factor 1) and (factor 2).

(factor 1): A change in printer. Practically, it can be a change in environment (temperature and humidity, etc.), a change in the device characteristics of a printer (for example, the characteristics of a laser, an LED, a thermal head, etc.), the variance in material medium, etc.

(factor 2): Defective setup. For example, it can be an inappropriate amending operation on color density.

When there is no change in printer derived from the (factor 1), or there is a very small and ignorable change, a photographic print can be obtained with preferable color density by adjusting the setup contents at the time when a defect occurs. On the other hand, when a change in printer is large and cannot be ignored, a photographic print with preferable color density cannot be always obtained only by adjusting the setup contents at the time when a defect occurs, but normally it is necessary to take appropriate action required to correct the change in the printer. For example, after taking action by improving the environment in temperature and humidity (or waiting until desired temperature and humidity conditions can be obtained), changing printer parts, setting an appropriate material media, etc., it is necessary to perform a remake. However, conventionally, since it is hard to judge whether or not the defective color density incurs defective setup, trial and error are repeated until a desired photographic print is obtained.

Additionally, a preferable photographic print cannot be obtained in many cases when an amending operation is performed without taking any action on a change in printer and without recognizing the change in printer as the main factor of the defect. Furthermore, although only a small number of photographic prints can be remade with preferable color density incidentally by excess adjustment, the excess defective setup can invite defective color density to a large number of other subsequent photographic prints if printer condition comes to original good condition.

The present invention has been developed to solve the above-mentioned problems, and aims at providing an image inspection apparatus and an image inspecting method capable of easily detecting the factor of a defective photographic print, and a program for them.

To attain the above-mentioned objective, the first aspect of the present invention is an image inspection apparatus used when an externally input image is processed and converted to printing data, and the printing data is output to a predetermined printer to allow the printer to generate a photographic print, and includes: a first storage device which associates setup information about at least a color and density of the process with each image and stores the information each time the printer is allowed to generate a photographic print; a first print simulation image generation device which generates a first print simulation image not including a change in the printer based on an image to be remade and the setup information stored in the first storage device as associated with the image to be remade before the printer remakes the photographic print; and a display device which displays the first print simulation image.

With the above-mentioned configuration, when a defective color density occurs in a photographic print, a print simulation image without a change in printer can be generated and displayed according to the image to be remade and the setup information stored in the first storage device as associated with the image to be remade before remaking the photographic print. Therefore, by observing the print simulation image compared with a defective image in the photographic print, it is possible to easily detect whether or not the factor of the defective photographic print has come from defective setup, and it is necessary to take action on defective setup only when it is judged that defective setup has been detected.

The second aspect of the present invention is based on the first aspect, and further includes: a density measuring device which reads a photographic print generated by the printer, and measures density of an image actually printed into the photographic print; a second storage device which stores a measurement value of the density measured by the density measuring device or a difference between the measurement value and a target value as associated with each image; and a second print simulation image generation device which generates a second print simulation image including a change in the printer based on the image to be remade, the setup information stored in the first storage device as associated with the image to be remade, and the information stored in the second storage device as associated with the image to be remade. The display device displays the second print simulation image simultaneously with or by switching to or from the first print simulation image.

With the above-mentioned configuration, when a defective color density occurs in a photographic print, the first print simulation image without a change in printer and the second print simulation image including a change in printer are displayed simultaneously or by a switch from one to the other. Therefore, it can be easily detected whether the defective photographic print has come from defective setup or a change in printer by comparing and observing the first print simulation image with the second print simulation image. As a result, it can be easily judged whether action is to be taken on defective setup or a change in printer.

The third aspect of the present invention is a method including: a step of storing, each time an externally input image is processed and converted to printing data, and the printing data is output to a predetermined printer to allow the printer to generate a photographic print, setup information about at least one of color and density of the process in a predetermined first storage device as associated with each image; a step of generating a first print simulation image not including a change in the printer based on an image to be remade and the setup information stored in the first storage device as associated with the image to be remade before the printer remakes the photographic print; and a step of displaying the first print simulation image.

The fourth aspect of the present invention is based on the third aspect, and further includes: a step of reading a photographic print generated by the printer, and measuring density of an image actually printed into the photographic print; a step of storing in a predetermined second storage device a measurement value of the density measured by the density measuring device or a difference between the measurement value and a target value as associated with each image; and a step of generating a second print simulation image including a change in the printer based on the image to be remade, the setup information stored in the first storage device as associated with the image to be remade, and the information stored in the second storage device as associated with the image to be remade. The second print simulation image is displayed simultaneously with or by switching to or from the first print simulation image.

The fifth aspect of the present invention is a program used to direct a computer to perform each step of the third aspect. The sixth aspect of the present invention is a program used to direct a computer to perform each step of the fourth aspect.

According to the present invention, a factor of a defective photographic print can be easily detected, and a preferable photographic print can be obtained without fail.

BRIEF DESCRIPTION OF THE DRAWINGS

FIG. 4 is an explanatory view showing the flow of the print simulation image displaying process when an image is remade.

DETAILED DESCRIPTION OF THE PREFERRED EMBODIMENTS

The best modes for embodying the present invention are explained below in detail by referring to the attached drawings.

Figure 1:
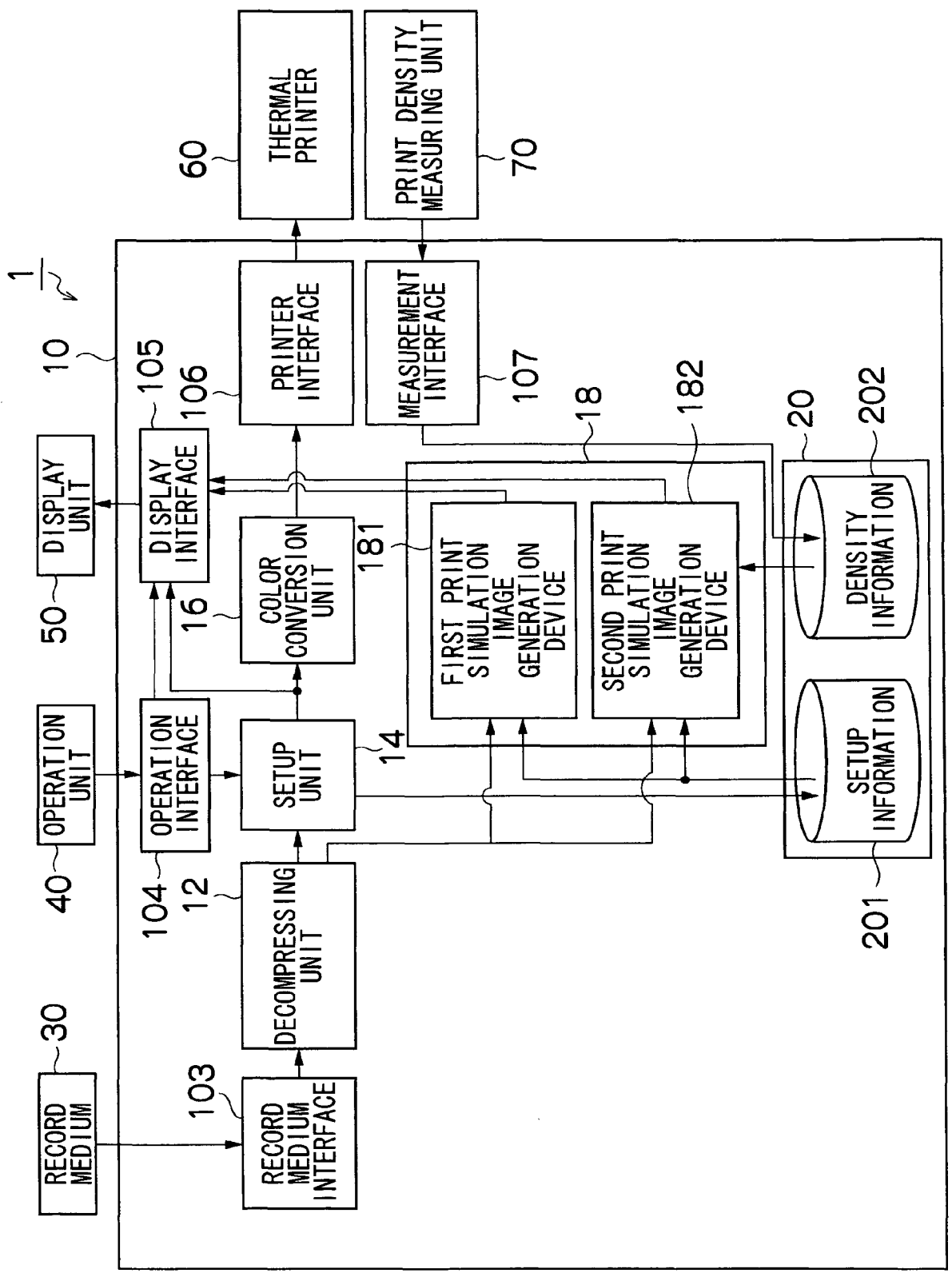
FIG. 1 is a block diagram of the important portion of the printing system including a control device to which the present invention is applied.

FIG. 1 is a block diagram of the important portion of a printing system 1 including a control device 10 to which the present invention is applied.

In FIG. 1, the printing system 1 is configured mainly by the control device 10 (image inspection apparatus), an operation unit 40, a display unit 50, a thermal printer 60, and a print density measuring unit 70.

The control device 10 performs a predetermined process on an image read from a record medium 30 to change the image to printing data, outputs the printing data to the thermal printer 60, and allows the thermal printer 60 to generate a photographic print.

The operation unit 40 operates an operator or a common user, and is used in performing an amending operation on color density. Although there are no specific restrictions, it is configured by, for example, a keyboard and a mouse.

The display unit 50 realizes various types of display of images such as an image read from the record medium 30 and treated in a predetermined process, a print simulation image, a color density amending operation screen, etc. Although there are no specific restrictions, it is configured by, for example, a CRT, etc.

The thermal printer 60 prints an image by supplying heat energy to thermal paper. Although there are no specific restrictions, for example, it is configured by a printer in the TA (thermo-auto-chrome) system using the type of specific paper which is colored by heat and fixed by illumination of a beam having a predetermined wavelength.

The print density measuring unit 70 measures the color density of an image actually printed as a photographic print.

The control device 10 is configured mainly by a decompressing unit 12, a setup unit 14, a color conversion unit 16, a print simulation image generation unit 18 (a first print simulation image generation device 181, a second print simulation image generation device 182), a storage unit 20 (a first storage device 201, a second storage device 202), a record medium interface 103, an operation interface 104, a display interface 105, a printer interface 106, and a measurement interface 107.

The display interface 105 reads a user image from the record medium 30 such as a memory card, etc. An image is normally compressed in a predetermined compressing system such as the JPEG (joint photographic image cording experts group), etc., and recorded on the record medium 30. After decompressed by the decompressing unit 12 as necessary, the image is input to the setup unit 14.

The setup unit 14 receives an image, and performs a setup process such as a color density adjustment, etc. on the image based on a predetermined lookup table (LUT). The setup process is performed not only as auto-setup automatically performed by the setup unit 14 based on an input image, but also performed with an amount of manual adjustment added when the operation unit 40 indicates an amount of manual adjustment. Practically in the manual adjustment, the display unit 50 displays an image setup by the setup unit 14. Therefore, the operator inputs an amount of adjustment for each of the density (D), cyan (C), magenta (M), and yellow (Y) through the operation unit 40 (for example, a keyboard and a mouse) while observing the displayed image. The setup unit 14 resets the lookup table depending on the manually specified amount of adjustment, and the image processed based on the lookup table on the display unit 50. Normally, the adjustment of D is called "density adjustment", and the adjustment of C, M, and Y is called "color adjustment".

The color conversion unit 16 performs color conversion on the setup-processed image based on the characteristic of the thermal printer 60 (for example, the device characteristic of a printer such as a thermal head, etc. and the characteristic of a material medium such as paper, etc.). The color converted image (printing data) is output to the thermal printer 60 through the measurement interface 107, and the image is printed on the thermal paper by the thermal printer 60, thereby generating a photographic print.

The first storage device 201 stores the setup information about the setup process by the setup unit 14 as associated with each image to be printed each time a photographic print is generated by the thermal printer 60. The setup information includes the information about the adjustment (color density adjustment) for each of the density (D), cyan (C), magenta (M), and yellow (Y), for example, a finally determined lookup table, and an amount of manual adjustment, and stored as associated with, for example, an image file name.

The second storage device 202 stores, as associated with an image to be printed, the measurement value of color density for each photographic print measured by the print density measuring unit 70 each time a photographic print is generated by the thermal printer 60. Both the target value of color density and the measurement value of color density can be stored, and the difference between the target value of color density and the measurement value of color density can be stored. According to the present embodiment, the average density of D, C, M, and Y in an image is stored as associated with an image file name.

The first print simulation image generation device 181 generates the first print simulation image not including a change in the thermal printer 60 according to the image to be remade and the setup information stored in the first storage device 201 as associated with the image to be remade before remaking a photographic print.

The second print simulation image generation device 182 generates the second print simulation image including a change in the thermal printer 60 according to the image to be remade, the setup information stored in the first storage device 201 as associated with the image to be remade, and the measurement value (or a difference between a measurement value and a target value) of color density stored in the second storage device 202 as associated with the image to be remade before remaking a photographic print on the thermal printer thermal printer 60.

Figure 2:
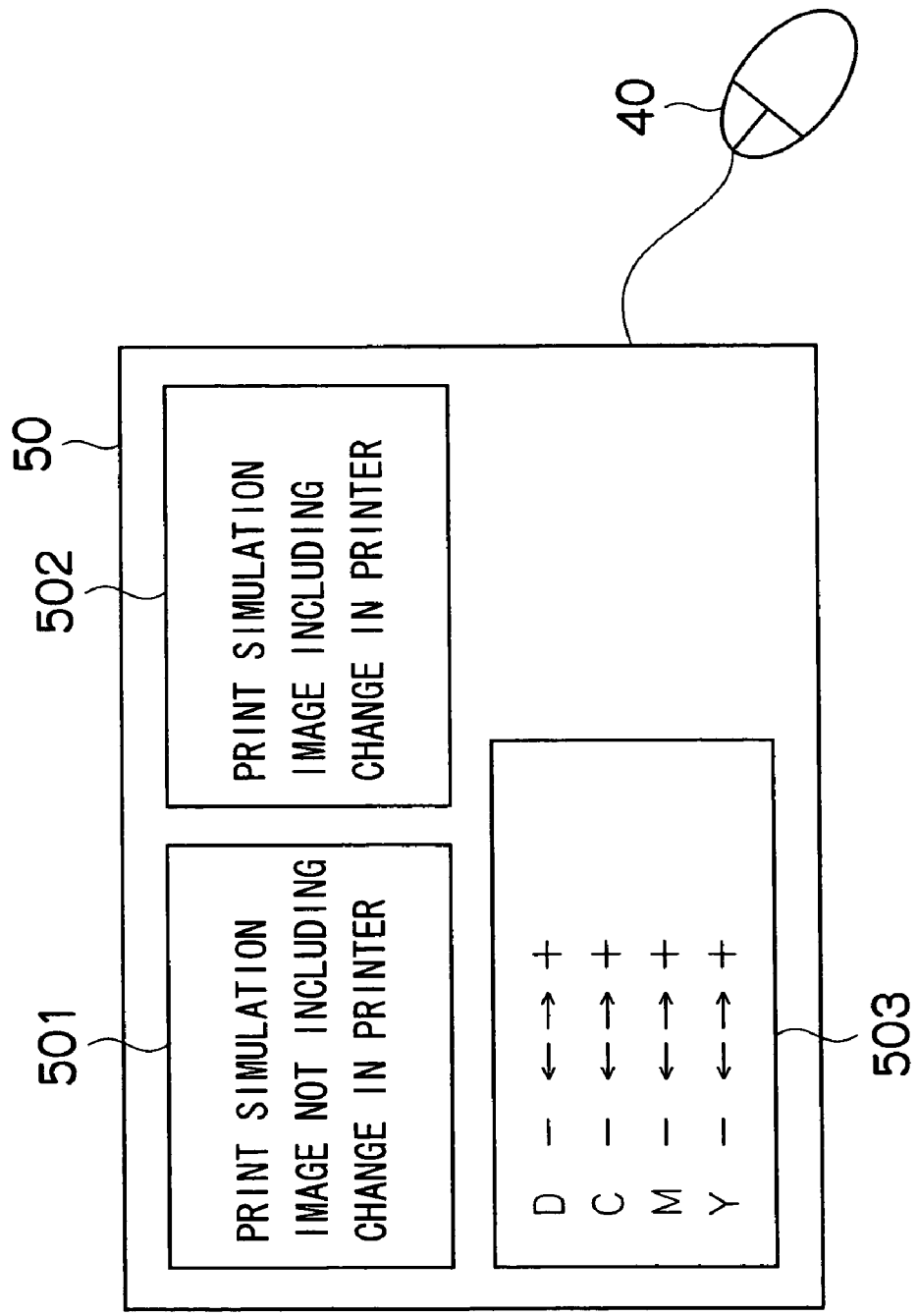
FIG. 2 shows an example of displaying a print simulation image.

The first print simulation image not including a change in the thermal printer 60 and the second print simulation image including a change in the thermal printer 60 are displayed on the display unit 50 as possibly compared with each other as shown in FIG. 2 through the display interface 105. FIG. 2 shows an example of simultaneously displaying a first print simulation image 501 and a second print simulation image 502. It is also possible to enlarge and display only the first print simulation image 501, or enlarge and display only the second print simulation image 502. The operation unit 40 switches the display among the simultaneous display, the display of the first print simulation image 501 only, and the display of the second print simulation image 502 only. Additionally, the operation unit 40 can specify the amount of adjustment for each of the density (D), cyan (C), magenta (M), and yellow (Y) while comparing and observing the first and second print simulation images 501 and 502.

Figure 3:
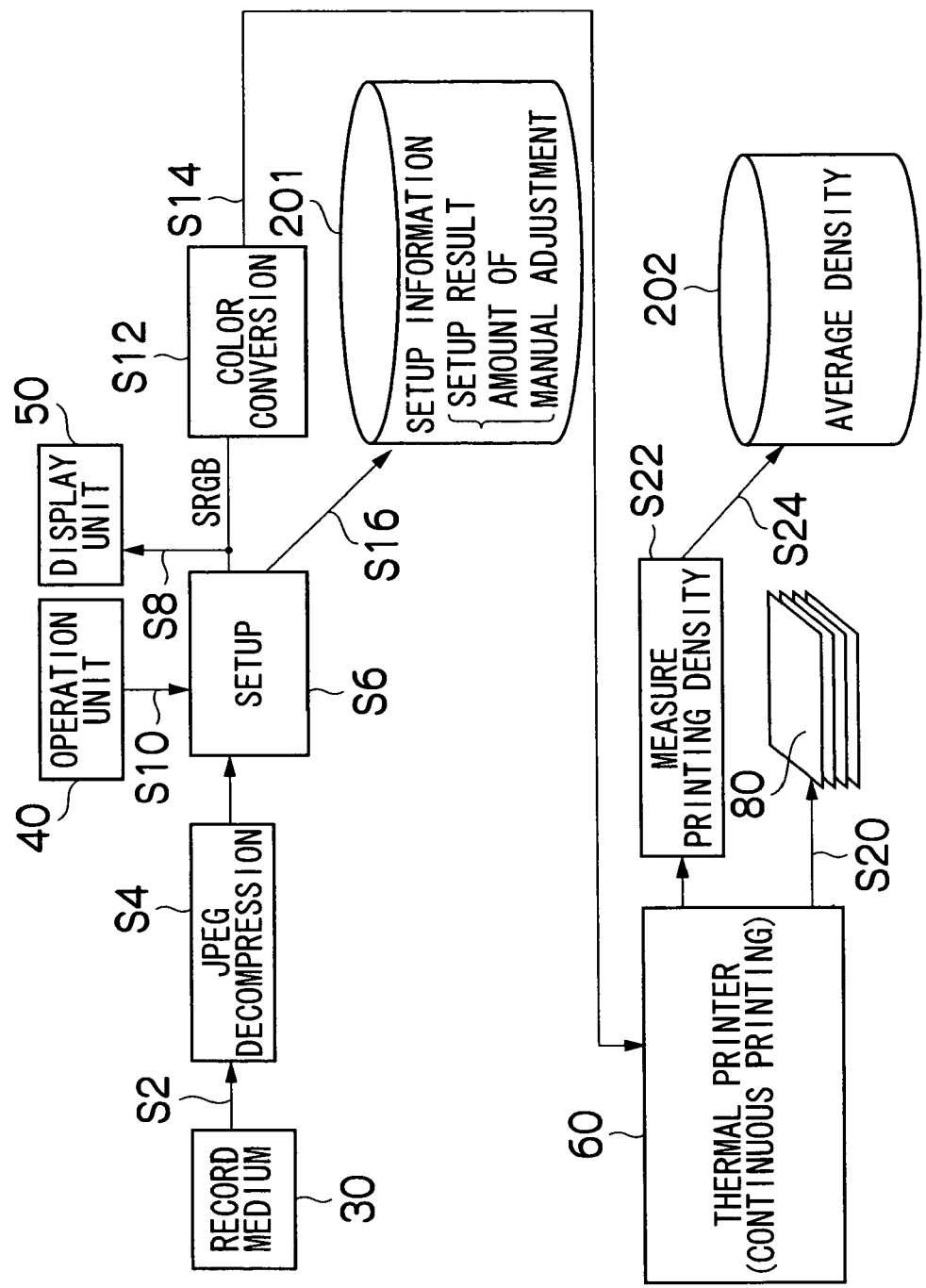
FIG. 3 is an explanatory view showing the flow of the continuous printing process.

The flow of the continuous printing process is explained below by referring to FIG. 3.

In the control device 10, a plurality (for example, 20 pieces) of images compressed in a JPEG process are sequentially read from the record medium 30 (step S2), decompressed (step S4), treated in the setup process (auto-setup) based on a predetermined lookup table (step S6), and displayed on the display unit 50 (step S8). That is, an image whose color density (D, C, M, and Y) is adjusted is observed by the display unit 50. Furthermore, when the amount of adjustment for each of the D, C, M, and Y is manually indicated (step S11), the lookup table is reset by the indication (step S6), the image treated in the setup process with the amount of the manual adjustment added is displayed on the display unit 50 (step S8).

The image treated in the setup process is also treated by color conversion based on the characteristic of the thermal printer 60 (step S12), and is output as printing data to the thermal printer 60 (step S14). On the other hand, the setup information is associated with each image and stored in the first storage device 201 (step S16). For example, the finally determined lookup table and amount of manual adjustment is associated with the file name of the image and stored.

The thermal printer 60 generates a photographic print 80 according to the printing data output from the control device 10 (step S20). The image printed on the photographic print 80 is read by the print density measuring unit 70, and the color density of the image is measured (step S22). The average value (average density) of the measured color density is stored in the second storage device 202 as associated with each image (step S24). For example, the average value of the color density in one image is associated with the file name of the image for each of the D, C, M, and Y and stored.

The flow of the remaking process is explained below by referring to FIG. 4 by assuming that defective color density has occurred in the continuous printing sequentially performed on a plurality of images.

In FIG. 4, a plurality of images compressed in the JPEG process are read from the record medium 30 (step S32), and decompressed (step S34). Then, the specification information specifying an image to be remade is input by the operation unit 40 (step S36). For example, the order from the head is specified. Then, the setup information associated with the specified image to be remade is read from the first storage device 201 (step S38). The average density (color density measurement value) associated with the specified image to be remade is read from the second storage device 202, and the difference between the color density measurement value and a color density target value is calculated (step S40).

Based on the image to be remade and the setup information stored in the first storage device 201 associated with the image to be remade, the first print simulation image not including a change in the thermal printer 60 is generated (step S42). On the other hand, based on the image to be remade, the setup information stored in the first storage device 201 associated with the image to be remade, and the difference between the color density measurement value and the color density target value, the second print simulation image including a change in printer is generated (step S44).

The generated print simulation images 501 and 502 are displayed on the display unit 50 so that they can be compared and observed as shown in FIG. 2.

In FIG. 2, when the color density of the first print simulation image 501 not including a change in printer is preferable and the color density of the second print simulation image 502 including a change in printer is defective, the factor of the defective color density is not defective setup, but is considered to be a change in the thermal printer 60. Thus, when it is determined that defective color density has occurred due to a change in the thermal printer 60, the environment of the temperature and humidity is improved (or a preferable condition of the temperature and humidity is awaited), the parts of the printer are replaced, an appropriate material medium is used, and any other measures are taken and then a remaking process is performed, thereby obtaining a preferable photographic print.

When the first print simulation image 501 not including a change in printer is defective, it can be determined that there is defective setup. If it is judged that defective setup has occurred, the user operates, for example, the operation unit 40, and specifies the amount of adjustment of the D, C, M, and Y.

In a printing sequence in which a large amount of data is continuously printed, there can be defective color density in a photographic print due to stored heat in the thermal head, etc. Manual adjustment depends on the skill of an operator. A printing terminal which can be operated by a user at a store cannot be operated by an operator. If defective color density of a photographic print occurs by various factors, and defective color density occurs, it is necessary to remake a photographic print. In the present invention, as described above, the first print simulation image 501 not including a change in the thermal printer 60 and the second print simulation image 502 including a change in the thermal printer 60 are displayed such that they can be compared and observed. As a result, it can be easily detected whether or not the defective color density comes from a change in the thermal printer 60. Therefore, it can be easily judged whether action is to be taken on defective setup or action is to be taken on a change in printer. As a result, a preferable photographic print can be obtain by a remade without fail.

In the above-mentioned explanation, the color density measurement value is stored, and when a photographic print is remade, the difference between the color density measurement value and the color density target value is calculated. However, the present invention is not limited to this application. That is, both color density measurement value and color density target value can be stored, or the difference between the color density measurement value and the color density target value can be stored and read from the storage device during the remaking.

In the explanation above, a printer is a color printer, and adjustment is made on each of the primary colors. However, the present invention is not limited to this application. That is, a printer can be a monochrome printer, and adjustment can be made only on the density in monochrome.

What is claimed is:

1. An image inspection apparatus used when an externally input image is processed and converted to printing data, and the printing data is output to a predetermined printer to allow the printer to generate a photographic print, comprising:
   a first storage device which associates setup information about at least a color and density of the process with each image and stores the information each time the printer is allowed to generate a photographic print;
   a first print simulation image generation device which generates a first print simulation image including no change in the printer based on an image to be remade and the setup information stored in the first storage device as associated with the image to be remade before the printer remakes the photographic print;
   a display device which displays the first print simulation image;
   a density measuring device which reads a photographic print generated by the printer, and measures density of an image actually printed into the photographic print;
   a second storage device which stores a measurement value of the density measured by the density measuring device or a difference between the measurement value and a target value as associated with each image; and
   a second print simulation image generation device which generates a second print simulation image including a change in the printer based on the image to be remade, the setup information stored in the first storage device as associated with the image to be remade, and the information stored in the second storage device as associated with the image to be remade, wherein the display device displays the second print simulation image and the first print simulation image so that they can be compared and observed.

2. The image inspection apparatus according to claim 1, wherein the display device displays the second print simulation image simultaneously with or by switching to or from the first print simulation image.

3. An image inspecting method, comprising the steps of:
   a step of storing, each time an externally input image is processed and converted to printing data, and the printing data is output to a predetermined printer to allow the printer to generate a photographic print, setup information about at least one of color and density of the process in a predetermined first storage device as associated with each image;
   a step of generating a first print simulation image including no change in the printer based on an image to be remade and the setup information stored in the first storage device as associated with the image to be remade before the printer remakes the photographic print;
   a step of displaying the first print simulation image;
   a step of reading a photographic print generated by the printer, and measuring density of an image actually printed into the photographic print;
   a step of storing in a predetermined second storage device a measurement value of the density measured by the density measuring device or a difference between the measurement value and a target value as associated with each image; and
   a step of generating a second print simulation image including a change in the printer based on the image to be remade, the setup information stored in the first storage device as associated with the image to be remade, and the information stored in the second storage device as associated with the image to be remade, wherein the second print simulation image and the first print simulation image are displayed so that they can be compared and observed.

4. The image inspecting method according to claim 3, wherein the second print simulation image is displayed simultaneously with or by switching to or from the first print simulation image.

5. A computer-readable medium encoded with a computer program used to direct a predetermined computer to perform a process comprising:
   storing, each time an externally input image is processed and converted to printing data, and the printing data is output to a predetermined printer to allow the printer to generate a photographic print, setup information about at least one of color and density of the process in a predetermined first storage device as associated with each image;
   generating a first print simulation image including no change in the printer based on an image to be remade and the setup information stored in the first storage device as associated with the image to be remade before the printer remakes the photographic print;
   displaying the first print simulation image;
   reading a photographic print generated by the printer, and measuring density of an image actually printed into the photographic print;
   storing in a predetermined second storage device a measurement value of the density measured by the density measuring device or a difference between the measurement value and a target value as associated with each image; and
   generating a second print simulation image including a change in the printer based on the image to be remade, the setup information stored in the first storage device as associated with the image to be remade, and the information stored in the second storage device as associated with the image to be remade, wherein the second print simulation image and the first print simulation image are displayed so that they can be compared and observed.

6. The computer program according to claim 5, wherein the second print simulation image is displayed simultaneously with or by switching to or from the first print simulation image.

7. The image inspection apparatus according to claim 1, wherein a first storage device which retains a memory of the setup information, image, and an association of the setup information, image, and an association of the setup information with a filename of the image.

8. The image inspection apparatus according to claim 1, wherein the display device displays the second print simulation image simultaneously with or by switching to or from the first print simulation image so that it can be determined that the factor of the defective color density is a change in the printer when the color density of the first print simulation image is preferable and the color density of the second print simulation image is defective and so that it can be determined that there is defective setup when the first print simulation image is defective.

9. The computer program according to claim 5, wherein the second print simulation image is simultaneously displayed with or by switching to or from the first print simulation image so that it can be determined that the factor of the defective color density is a change in the printer when the color density of the first print simulation image is preferable and the color density of the second print simulation image is defective and so that it can be determined that there is defective setup when the first print simulation image is defective.

10. An image inspecting method according to claim 3, wherein the second print simulation image is simultaneously displayed with or by switching to or from the first print simulation image so that it can be determined that the factor of the defective color density is a change in the printer when the color density of the first print simulation image is preferable and the color density of the second print simulation image is defective and so that it can be determined that there is defective setup when the first print simulation image is defective.

* * * * *